United States Patent
Crispe et al.

[15] 3,642,114
[45] Feb. 15, 1972

[54] BISCUIT HANDLING MACHINERY

[72] Inventors: Stanley William Crispe, Liverpool; Henry Wood, St. Helens, both of England

[73] Assignee: T & T Vicars Limited, Lancashire, England

[22] Filed: Oct. 20, 1970

[21] Appl. No.: 82,292

[30] Foreign Application Priority Data

Dec. 6, 1969 Great Britain......................59,687/69

[52] U.S. Cl. ............................198/25, 198/31 AA, 198/103
[51] Int. Cl.................B65g 47/08, B65g 47/26, B65g 47/90
[58] Field of Search..........................198/25, 33 AD, 103, 66; 107/1 F, 1 G; 214/1 R

[56] References Cited

UNITED STATES PATENTS 1,300,010    4/1919    Porter..............................198/31 AA

*Primary Examiner*—Edward A. Sroka
*Attorney*—Norris & Bateman

[57] ABSTRACT

Biscuit handling machinery adapted to receive a stream of biscuits and to deliver biscuits from said stream alternately to each of two conveyor means respectively, the biscuits on one conveyor means being inverted relative to those on the other and comprising a drumlike member which is rotatable about a horizontal axis and which has spaced recesses around its periphery, alternate of said recesses being of greater depth than the intermediate recesses, means for feeding biscuits from a feed stream thereof into consecutive recesses as the drumlike member rotates, means for removing biscuits from the shallower recesses and placing them onto a first conveyor means, thereby leaving the biscuits in the deeper recesses to be transported by the member so as to be released therefrom under the influence of gravity in inverted condition onto a second conveyor means.

9 Claims, 2 Drawing Figures

BISCUIT HANDLING MACHINERY

This invention concerns biscuit handling machinery, and more particularly apparatus adapted to receive a stream of biscuits and to deliver biscuits from said stream alternately to each of two conveyor means respectively, the biscuits on one conveyor means being inverted relative to those on the other. Such apparatus will hereinafter be termed apparatus of the kind referred to.

Apparatus of the kind referred to is suitable for use in the manufacture of cream-filled sandwich biscuits, it being understood that the cream filling can be applied to the biscuits on one of the conveyor means, the streams of biscuits on the two conveyor means then being reunited in superimposed relationship to form the cream-filled sandwich biscuits.

According to the present invention apparatus of the kind referred to comprises a drumlike member which is rotatable about a horizontal axis and which has spaced recesses around its periphery, alternate of said recesses being of greater depth than the intermediate recesses, means for feeding biscuits from a feed stream thereof into consecutive recesses as the drumlike member rotates, means for removing biscuits from the shallower recesses and placing them onto a first conveyor means, thereby leaving the biscuits in the deeper recesses to be transported by the member so as to be released therefrom under the influence of gravity in inverted condition onto a second conveyor means.

The invention will be further apparent from the following description with reference to the several figures of the accompanying drawings which show, by way of example only, one form of apparatus embodying the invention.

Figure 1:
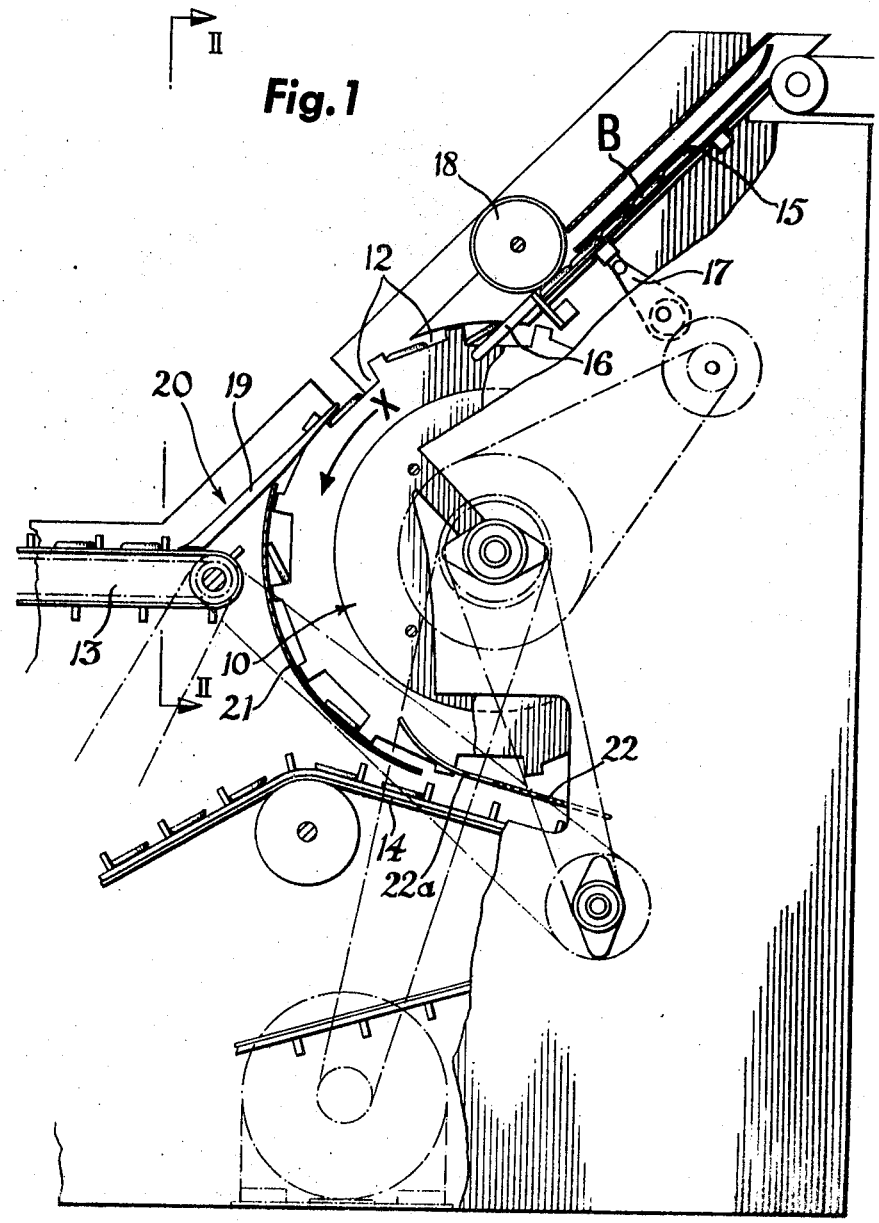
FIG. 1 shows a partly sectioned side elevation of the apparatus.
Figure 2:
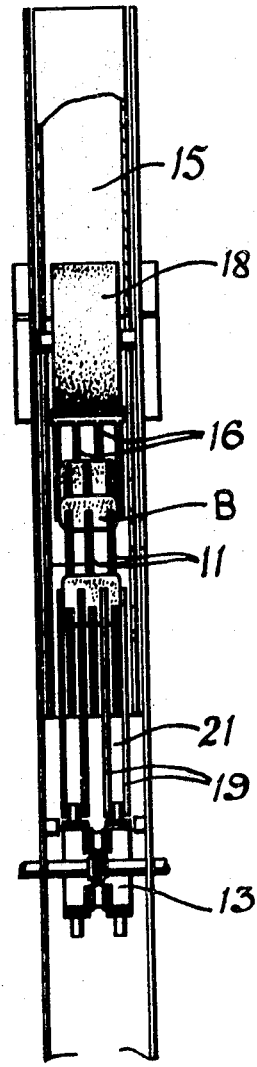
FIG. 2 shows a front view of the apparatus on the line II—II of FIG. 1.

Referring now to the drawings it will be seen that the apparatus essentially comprises a drumlike member generally indicated by the reference numeral 10 adapted to be rotated about a horizontal axis in the direction of the arrow X. As can best be seen from FIG. 2 the drumlike member 10 is comprised by a plurality of discs 11 secured on an axle with spacing members therebetween.

Recesses 12 are formed around the periphery of the member 10, each extending across the width thereof. These recesses are formed by cutout portions in the individual discs 11. Alternate recesses 12 are of greater depth than the intermediate recesses 12 for a purpose which will be apparent hereinafter.

The apparatus includes two endless conveyor bands, of known construction, for conveying separate streams of biscuits. Parts of these bands are indicated at 13 and 14 respectively.

A stream of biscuits B is fed to the apparatus by means of a chute 15. The lowermost part of the chute is fixed and comprised by a number of prongs 16 which extend into the spaces between the discs 11 of the member 10. The upper part of the chute 15 is mounted for oscillating movement by means of an eccentric drive generally indicated at 17 whereby the biscuits B are fed onto the prongs 16 one by one, the top mounting for the prongs 16 one by one, the top mounting for the prongs 16 constituting a stop for the stream of biscuits when the chute 15 is in its lowermost position. A resilient roll 18 is provided to ensure that the biscuits are metered down onto the prongs 16 without undue breakage thereof.

The chute is oscillated in synchronism with rotation of the member 10 so that a biscuit B is fed into each recess 12 on the periphery of the member 10 as the latter revolves past the bottom end of the chute.

A series of prongs 19 forming a slide 20 extend upwardly from the conveyor 13 and into the spaces between the discs 11 of the member 10. These prongs 19 forming the slide 20 are set at such a height that they lift alternate biscuits (that is those disposed in the shallower recesses 12) off the periphery of the drum to enable them to slide down onto the conveyor 13.

The prongs 19 are set above the level of the biscuits B in the deeper recesses and it follows that alternate biscuits are carried round by the drum to fall therefrom under the influence of gravity in inverted condition onto the conveyor 14 at the bottom of the drum 10. A guide plate 21 is provided to ensure that the biscuits do not fall from the member 10 prematurely and are correctly positioned on the conveyor 14. To prevent the possibility of any biscuits remaining in their recesses on the drum 10, a further guide plate 22 is provided which terminates with pronglike extensions 22a which extend into the spaces between the discs 11 of the member 10.

It will be noticed that the eccentric drive 17, and conveyors 13 and 14 are all driven by chains from the axle of the member 10, to ensure that all parts of the apparatus run in proper synchronism.

It will be appreciated that the upwardly directed faces of the biscuits B on the conveyor 14 can be covered with a cream filling, the biscuits from the conveyor 13 subsequently being reunited with those on the conveyor 14 in superimposed relationship to form finished cream filled sandwich biscuits.

It will be appreciated that it is not intended to limit the invention to the above example only, many variations, such as might readily occur to one skilled in the art being possible without departing from the scope thereof as defined by the appended claims.

What is claimed is:

1. Apparatus adapted to receive a stream of biscuits and to deliver biscuits from said stream alternately to each of two conveyor means respectively, the biscuits on one conveyor means being inverted relative to those on the other and comprising a drumlike member which is rotatable about a horizontal axis and which has spaced recesses around its periphery, alternate of said recesses being of greater depth than the intermediate recesses, means for feeding biscuits from a feed stream thereof into consecutive recesses as the drumlike member rotates, means for removing biscuits from the shallower recesses and placing them onto a first conveyor means, thereby leaving the biscuits in the deeper recesses to be transported by the member so as to be released therefrom under the influence of gravity in inverted condition onto a second conveyor means.

2. Apparatus according to claim 1 wherein said drumlike member is comprised by a plurality of disclike parts axially spaced from one another along the axis of rotation, said recesses being defined by cutout portions in the disclike parts.

3. Apparatus according to claim 2 wherein said means for removing biscuits from the shallower recesses comprises a slide extending between said first conveyor means and the drumlike member for transfer of biscuits under the influence of gravity, the upper end of said slide being defined by fingers which extend between the disclike parts forming the drum at a position below the bases of the shallower recesses and above the level of biscuits located in the deeper recesses, whereby as the drum rotates biscuits located in the shallower recesses only are removed from such recesses for transfer down slide.

4. Apparatus according to claim 3 including a guide plate extending over the periphery of the drumlike member between said slide and a position on the underside of the drumlike member whereby biscuits which are located in the deeper recesses and which pass the slide are restrained from falling from the deeper recesses until they are fully inverted at the bottom of the drumlike member.

5. Apparatus according to claim 4 including a further guide plate disposed at the underside of the drumlike member and terminating in fingers which extend between the disclike parts to ensure that all biscuits located in the deeper recesses and carried thereby to the underside of the drumlike member are displaced from such recesses to fall onto said second conveyor means.

6. Apparatus according to claim 2 wherein said means for feeding biscuits into consecutive recesses of the drumlike member comprises a chute whose lower end is comprised by fingers which extend between disclike parts and means for metering biscuits down the chute to ensure that one such biscuit is fed to each consecutive recess as it passes the chute.

7. Apparatus according to claim 3 wherein said means for feeding biscuits into consecutive recesses of the drumlike member comprises a chute whose lower end is comprised by fingers which extend between disclike parts and means for metering biscuits down the chute to ensure that one such biscuit is fed to each consecutive recess as it passes the chute.

8. Apparatus according to claim 4 wherein said means for feeding biscuits into consecutive recesses of the drumlike member comprises a chute whose lower end is comprised by fingers which extend between disclike parts and means for metering biscuits down the chute to ensure that one such biscuit is fed to each consecutive recess as it passes the chute.

9. Apparatus according to claim 5 wherein said means for feeding biscuits into consecutive recesses of the drumlike member comprises a chute whose lower end is comprised by fingers which extend between disclike parts and means for metering biscuits down the chute to ensure that one such biscuit is fed to each consecutive recess as it passes the chute.

* * * * *

UNITED STATES PATENT OFFICE
CERTIFICATE OF CORRECTION

Patent No. 3,642,114         Dated Feb. 15, 1972

Inventor(s) Stanley William Crispe and Henry Wood

It is certified that error appears in the above-identified patent and that said Letters Patent are hereby corrected as shown below:

Column 1, line 62, after "16" delete "one by one, the top mounting for the prongs 16".

Column 2, line 59, after "down" insert --the--.

Signed and sealed this 11th day of July 1972.

(SEAL)
Attest:

EDWARD M. FLETCHER, JR.
Attesting Officer

ROBERT GOTTSCHALK
Commissioner of Patents